Dec. 27, 1966   D. O. MYERS   3,294,603
METHOD FOR TREATING A MATERIAL IN A SOLUTION
Filed Oct. 16, 1963
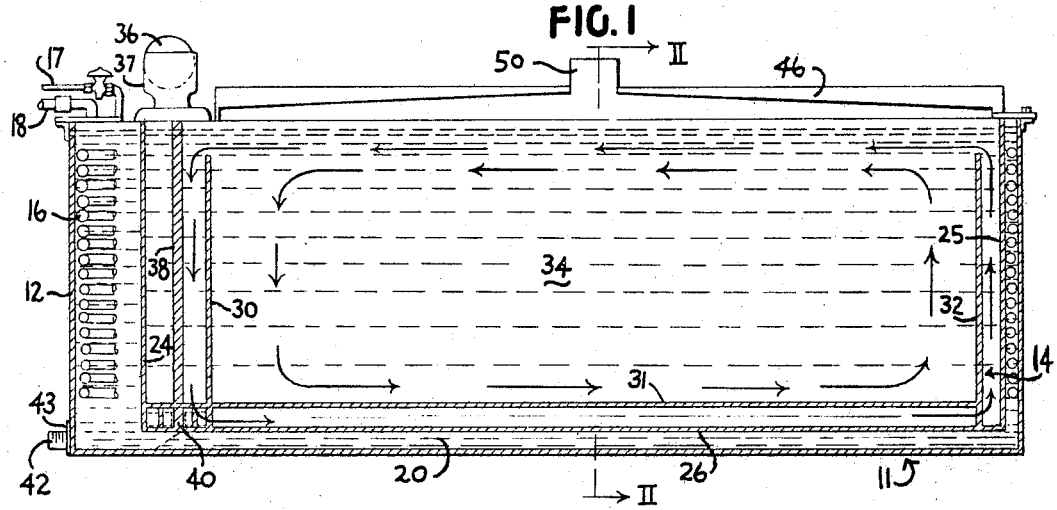
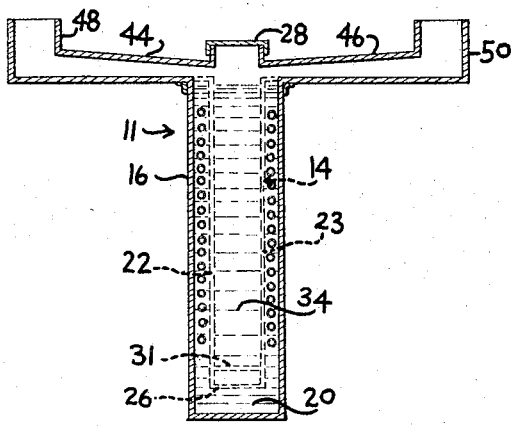
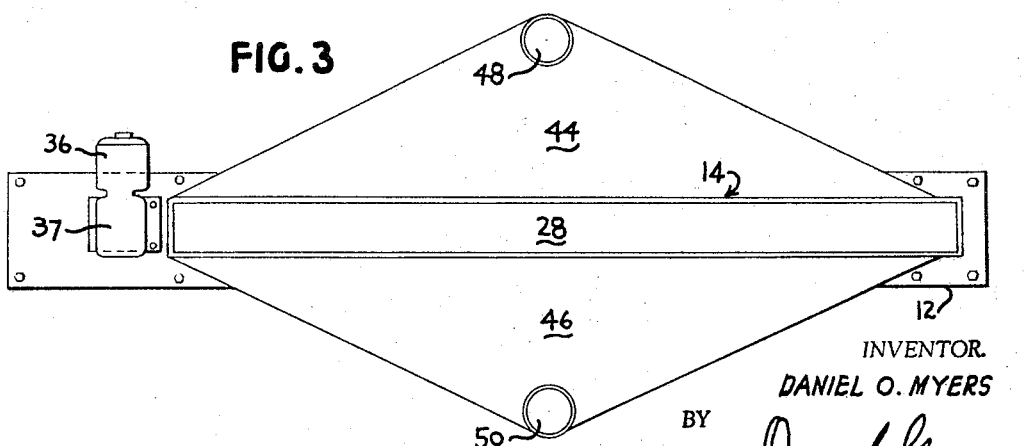
INVENTOR.
DANIEL O. MYERS
BY
Oscar L. Spencer
ATTORNEY United States Patent Office 3,294,603
Patented Dec. 27, 1966

3,294,603
METHOD FOR TREATING A MATERIAL
IN A SOLUTION
Daniel O. Myers, Mansfield, Ohio, assignor to Pittsburgh Plate Glass Company, Pittsburgh, Pa., a corporation of Pennsylvania
Filed Oct. 16, 1963, Ser. No. 316,718
2 Claims. (Cl. 156—24)

This invention relates to a method and apparatus for treating material in a solution in a manner to minimize pre-treatment through contact between the material and vapors from the treating solution. More specifically, the invention relates to methods and apparatus for treating glass sheet in an acid etch solution in a manner to substantially eliminate any pre-etching of the glass sheet by acid vapors from the etching solution as the glass sheet is dipped into the etching bath.

It is desirable for many uses of glass to have a surface or surfaces of a glass sheet etched. This etching primarily serves to render the surface of the glass less reflective to incident light than the polished surface characteristic of sheet and plate glass. In recent years etched sheets of glass have been used for TV implosion plates.

The surfaces of glass sheets may be conveniently etched by dipping the sheets in a solution containing hydrofluoric acid. Such processes are well known in the prior art. However, one problem encountered in known etching processes where glass sheets are dipped in solutions containing hydrofluoric acid is the premature treatment of glass by vapors of the etching solution that are found above the etching bath. These vapors attack the glass surfaces as the glass is lowered into the bath and, while the time of contact is very short, the extent of such pre-treatment is sufficient to affect the degree of etch produced during the subsequent treatment within the solution. Because of the non-uniform character of such vapors, an unequal pre-treatment invariably occurs, and streaks of unequal etching are evident on the finished products. It has been observed that those portions of the glass surface that are pre-etched by acid vapors fail to become etched to the same degree as other portions of the sheet during the submerged etching in the acid bath.

In accordance with the present invention, acid vapors that form above an acid etch solution are removed in a manner to provide a zone of entry into the bath that is essentially free from vapors—not only those vapors already present, but also vapors that form while a sheet of glass is being lowered into the acid etch solution. Briefly, this is accomplished by withdrawing vapors from above the acid etch bath at a zone adjacent the surface of the bath and on opposite sides of a central zone at the surface of the bath. Preferably, the vapors are continuously withdrawn while the glass sheet to be etched is lowered through the vapor free central zone and into the acid bath. This procedure is facilitated by the use of a relatively long and narrow upright container that will receive a vertically disposed sheet for etching. An opening at the top of the container provides access to the bath and a pair of ducts in each long side of the container remove vapors from above the bath. These ducts extend through the side walls, parallel to and adjacent the top surface of the etching bath within the container. The ducts need not extend along the entire length of the sides, but should extend a distance at least equal to the length of the largest glass sheet to be etched. The ducts communicate between the interior of the tank and a source of reduced pressure. Thus, vapors above the bath are exhausted in two opposite directions, i.e., toward the side walls, as long as a vacuum is applied to the ducts and, hence, a zone above the bath centrally of the container is provided that is essentially free from vapors.

This invention may be better understood in connection with accompanying drawings in which:

FIG. 1 is a side elevation view with portions shown in vertical section of a tank construction in accordance with the present invention;

FIG. 2 is a section of the tank shown in FIG. 1 taken along the line 2—2; and

FIG. 3 is a top plan view of the tank shown in FIG. 1.

Referring now to the drawings, there is shown a treating tank assembly indicated generally at 11 and consisting of an outer cooling jacket 12 of generally rectangular shape and an inner tank 14 of generally similar shape but of smaller dimension. Within outer tank 12 and surrounding inner tank 14 are refrigerating coils 16 connected at inlet 17 and outlet 18 with a source of refrigerant (not shown). A brine solution 20 is contained within outer cooling jacket 12 and surrounds refrigerating coils 16.

Inner tank 14 is constructed of relatively long and high side walls 22 and 23, narrow end walls 24 and 25, a bottom 26 and a cover 28. Baffle walls 30, 31 and 32 within inner tank 14 and parallel to but spaced from end wall 24, bottom 26 and end wall 25, respectively, provide a channel for circulating an etching solution 34 contained within inner tank 14. Preferably tank 14, the baffle walls, and all other parts exposed to solution 34 or vapors therefrom are constructed of acid resistant material such as Monel metal.

A motor 36 mounted atop a covered portion of inner tank 14 drives through gearbox 37, a shaft 38 extending downwardly through the circulating channel formed by end wall 24 and baffle wall 30. Attached to the distal end of shaft 38 and adjacent the bottom of inner tank 14 within the recirculating channel formed by bottom wall 26 and baffle wall 31 is an impeller 40. Rotation of impeller 40 circulates the etching solution 34 within the inner tank 14. Directly beneath the impeller 40 is an outlet pipe 42 extending through an orifice 43 in outer cooling jacket 12 for draining tank 14.

Extending perpendicularly from each side wall 22 and 23 of inner tank 14 is a narrow elongated duct 44 and 46, respectively, generally triangular shaped in plan and with the apex of the triangle farthest from the respective side wall. Each duct 44 and 46 communicates between a vent 48 and 50, respectively, and the interior of inner tank 14 adjacent the top thereof. The ducts open into the interior of tank 14 just above and parallel to the surface of the etching solution 34 contained within the tank 14. In the embodiment shown, the ducts extend substantially the entire length of tank 14. Vents 48 and 50 are connected to a source of reduced pressure, e.g., a vacuum pump (not shown).

In operation, a glass sheet to be etched, e.g., a circular sheet of glass 21 inches in diameter and $3/16$ inch thick for use as a TV implosion plate, is conditioned for the etch by being first cut to shape, seamed along the edges, washed and then conveyed to the etching station in a conventional manner. A treating tank assembly 11 is located at the etching station. An acid etch solution containing hydrofluoric acid is contained within inner tank 14. A brine solution within outer cooling jacket 12 is maintained at approximately 34 degrees Fahrenheit by refrigerating coils 16 through which a refrigerant, such as Freon, is circulated.

Cover 28 is removed from the top of inner tank 14 and a vacuum of approximately 5 inches water column is applied to vents 48 and 50. Vapors present at the surface of etching solution 34 in tank 14 are exhausted in opposite directions relative to a central plane of the tank 14 parallel to sides 22 and 23, through narrow elongated ducts 44 and 46, and out vents 48 and 50. A vertically disposed glass sheet is then lowered in a conventional manner into the etching solution 34 through the top surface of the bath at a central zone above the surface of the bath. The glass sheet is lowered into the solution and maintained therein for approximately 30 to 50 seconds, depending upon the degree of etch desired. During this time the etching solution is constantly agitated by impeller 40 rotated by electric motor 36. The constant agitation assures uniform etching over the entire surface of the glass sheet.

After the etching is complete the glass sheet is removed from inner tank 14 and taken to a rinsing station where it is washed and dried. Thereafter, the sheet may be further processed, for example, by bending and tempering as in the case of TV implosion plates.

From the above description of a specific embodiment of the present invention, it will be readily apparent to those skilled in the art that various modifications may be made without departing from the spirit of the invention. For example, the specific shape of the inner tank and outer cooling jacket may be varied to better facilitate sheets or other objects of different shapes than those herein contemplated. Similarly, the vents and ducts need not be constructed in precisely the manner disclosed herein as long as the ducts communicate between each side of a central zone above the etching bath and a zone of lower pressure. In addition, the ducts need not extend along the entire length of the etching tank as long as they extend a distance substantially equal to that of the object being treated to assure a complete removal of vapors that would otherwise be in the zone through which the material to be treated must pass in entering the surface of the treating bath. The reduced pressure applied through the vents 48 and 50 and ducts 44 and 46 may be continuously or intermittently applied, but must be applied during the introduction of the material to be treated into the bath.

While the present invention has been described with reference to the specific details of certain embodiments, it is not intended that such details shall be regarded as limitations on the scope of the invention, except insofar as included in the accompanying claims.

I claim:
1. In a method of etching a sheet of glass in a solution containing hydrofluoric acid, the steps comprising providing a bath of said solution in a vessel that will accommodate completely submerging a vertically disposed sheet of glass to be etched, withdrawing vapors from a zone immediately above the bath at a location closely adjacent to the surface of said bath in two opposite directions from a substantially vertical plane centrally of the bath, continuing to withdraw vapors in the said manner while lowering a vertically disposed sheet of glass through the zone immediately above the bath and into the bath at a location substantially coincident with said centrally located vertical plane and while removing the etched sheet of glass from said solution.

2. In the method of etching a sheet of glass in which a sheet of glass is passed through the surface of and into a glass etching solution having vapors in a region immediately above the surface thereof that are corrosive to glass and progressively immersing said glass sheet in said solution; the improvement comprising withdrawing vapors from immediately above and over said solution surface in said region through which said sheet is passed and continuing to withdraw said vapors from said region as said sheet of glass is introduced into and progressively immersed in said solution until it is submerged and thereafter removed from said solution.

References Cited by the Examiner
UNITED STATES PATENTS 2,543,019  2/1951  Henroteau et al. ____ 156—24 X
3,023,139  2/1962  Van Tetterode _____ 156—24

ALEXANDER WYMAN, *Primary Examiner.*

JACOB H. STEINBERG, *Examiner.*